(12) United States Patent
Kim

(10) Patent No.: US 10,783,391 B2
(45) Date of Patent: Sep. 22, 2020

(54) METHOD AND SYSTEM FOR RECOGNIZING LICENSE PLATE

(71) Applicant: CENTER FOR INTEGRATED SMART SENSORS FOUNDATION, Daejeon (KR)

(72) Inventor: Sanghoon Kim, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 42 days.

(21) Appl. No.: 16/197,502

(22) Filed: Nov. 21, 2018

(65) Prior Publication Data

US 2019/0156140 A1    May 23, 2019

(30) Foreign Application Priority Data

Nov. 23, 2017  (KR) .................. 10-2017-0157097

(51) Int. Cl.
    *G06K 9/32*     (2006.01)
    *G06K 9/00*     (2006.01)
    *G06T 5/50*     (2006.01)
    *G06K 9/36*     (2006.01)

(52) U.S. Cl.
    CPC ......... *G06K 9/3258* (2013.01); *G06K 9/0057* (2013.01); *G06T 5/50* (2013.01); *G06K 9/36* (2013.01); *G06K 2209/15* (2013.01); *G06T 2207/20221* (2013.01)

(58) Field of Classification Search
    CPC combination set(s) only.
    See application file for complete search history.

(56) References Cited

U.S. PATENT DOCUMENTS

| | | | |
|---|---|---|---|
| 6,754,369 B1 * | 6/2004 | Sazawa | G06K 9/3266 382/105 |
| 8,351,656 B2 * | 1/2013 | Spicola | G06T 7/62 382/110 |
| 10,366,533 B2 * | 7/2019 | Sugita | G06T 19/006 |

(Continued)

FOREIGN PATENT DOCUMENTS

| | | |
|---|---|---|
| KR | 19960042445 A | 1/2004 |
| KR | 20100134206 A | 7/2012 |

(Continued)

OTHER PUBLICATIONS

Korean Office Action, pp. 1-5 dated Dec. 26, 2018.

*Primary Examiner* — Tsung Yin Tsai
(74) *Attorney, Agent, or Firm* — Bond Schoeneck and King PLLC; David Nocilly

(57) ABSTRACT

Disclosed are a method and a system for recognizing a license plate. The method for recognizing a license plate according to an embodiment of the present disclosure includes generating a localization model for localizing a license plate area attached to an object by learning using image data including the preset object, and a recognition model for recognizing identification information of the license plate by learning using preset license plate image data; when input image is received, localizing a license plate area from the input image using the localization model; and recognizing identification information of a license plate of the corresponding object from the localized license plate area using the recognition model.

5 Claims, 9 Drawing Sheets

(56) References Cited

U.S. PATENT DOCUMENTS

| | | | | |
|---|---|---|---|---|
| 2007/0058856 A1* | 3/2007 | Boregowda | ........... | G06K 9/3258 |
| | | | | 382/159 |
| 2012/0057756 A1* | 3/2012 | Yoon | .................... | G06K 9/6256 |
| | | | | 382/104 |
| 2018/0121744 A1* | 5/2018 | Kim | ........................ | G06K 9/325 |
| 2018/0336427 A1* | 11/2018 | Gibbs | ................ | G06K 9/00825 |

FOREIGN PATENT DOCUMENTS

| KR | 101462289 B1 | 11/2014 |
|---|---|---|
| KR | 101780320 B1 | 10/2017 |

\* cited by examiner (a)

(b)

METHOD AND SYSTEM FOR RECOGNIZING LICENSE PLATE

CROSS-REFERENCE TO RELATED APPLICATIONS

This application claims priority under 35 U.S.C. § 119 to Korean Patent Application No. 10-2017-0157097 filed on Nov. 23, 2017, in the Korean Intellectual Property Office, the disclosures of which are incorporated by reference herein in their entireties.

BACKGROUND

Embodiments of the inventive concept described herein relate to a license plate recognition technology, and more particularly, relate to a method and a system for improving recognition accuracy of a license plate attached to an object.

A license plate recognition (LPR) system is configured to localize vehicle number data from an image captured by a camera. The LPR system has conventionally been used to crack down on an overspeed vehicle on a highway, or to detect an illegal parking vehicle on the street.

In addition, the LPR system has recently been widely used in an intelligent parking management system that allows a quick and convenient entrance to a parking lot.

Recently, the automobile license plate recognition system has been widely used in various fields such as parking, crime prevention, signal violation, speed violation, and the like.

However, conventional automobile license plate recognition system generally has many difficulties in localization of an automobile license plate due to difference in light and shade because of natural phenomenon or a lot of noise during rainy days, or reflections of sunlight during daytime and vehicle light at night, or the like.

Therefore, in order to more accurately localize the automobile license plate area and characters, many pre-processes, such as light and shade change of an image, determination of whether the pre-processes are required, determination of area where the pre-processes are required, contrast improvement, noise removal, localization of license plate candidate area, localization of character area, and the like are required.

Particularly, in this pre-process, a Sobel mask pattern algorithm is widely used as an outline detection algorithm among existing algorithms, and erosion and expansion algorithms are widely used as noise removal algorithms.

The inventive concept proposes a method and system for improving accuracy of the license plate recognition using a model that localizes the license plate area and a model that recognizes identification information from the license plate area.

SUMMARY

Embodiments of the inventive concepts provide a method and a system for improving recognition accuracy of a license plate attached to an object.

Specifically, embodiments of the inventive concepts provide a method and a system for improving license plate recognition accuracy using a model that localizes a license plate area from an image of an object, and a model that recognizes identification information of the localized license plate area.

According to an exemplary embodiment, a method for recognizing a license plate includes: generating a localization model configured for localizing a license plate area by learning using image data including a preset object image, wherein the license plate area is attached to the object, and generating a recognition model configured for recognizing identification information of the license plate by learning using preset license plate image data; when input image is received, localizing a license plate area from the input image using the localization model; and recognizing identification information of license plate attached to a corresponding object from the localized license plate area using the recognition model.

According to an exemplary embodiment, generating the localization model and the recognition model includes increasing the image data by combining at least one predetermined first noise pattern with the image data, and generating the localization model by learning using the increased image data including the first noise pattern, and increasing the license plate image data by combining at least one second noise pattern with the license plate image data, and generating the recognition model by learning using the increased license plate data including the second noise pattern.

According to an exemplary embodiment, recognizing the identification information includes, when a contrast of the localized license plate area is lower than a preset reference contrast, recognizing the identification information of the license plate of the corresponding object using the recognition model after adjusting the contrast of the localized license plate area to the reference contrast.

According to an exemplary embodiment, recognizing the identification information includes when the number of characters included in the recognized identification information is insufficient, enlarging and re-localizing the license plate area based on the insufficient number of the characters, and recognizing the identification information of the license plate of the corresponding object again from the re-localized license plate area using the recognition model.

According to an exemplary embodiment, recognizing the identification information includes when a structure of the identification information in the localized license plate area is a preset structure, and a preset character is not recognized in the recognition of the identification information, adding the preset character to the recognized identification information and recognizing the added identification information as identification information of the corresponding object.

According to an exemplary embodiment, the recognition model includes at least two recognition models, wherein recognizing the identification information includes recognizing the identification information of the corresponding object based on a confidence of identification information recognized using each of the two or more recognition models.

According to an exemplary embodiment, a system for recognizing a license plate includes a generation unit configured for generating a localization model configured for localizing a license plate area by learning using image data including a preset object image, wherein the license plate area is attached to the object, and generating a recognition model configured for recognizing identification information of the license plate by learning using preset license plate image data; a localization unit configured for localizing a license plate area from input image using the localization model when the input image is received; and a recognition unit configured for recognizing identification information of the license plate attached to a corresponding object from the localized license plate area using the recognition model.

According to an exemplary embodiment, the generation unit increases the image data by combining at least one predetermined first noise pattern with the image data, and generates the localization model by learning using the increased image data including the first noise pattern, and the generation unit increases the license plate image data by combining at least one second noise pattern with the license plate image data, and generates the recognition model by learning using the increased license plate data including the second noise pattern.

According to an exemplary embodiment, when a contrast of the localized license plate area is lower than a preset reference contrast, the recognition unit recognizes the identification information of the license plate of the corresponding object using the recognition model, after adjusting the contrast of the localized license plate area to the reference contrast.

According to an exemplary embodiment, when the number of characters included in the recognized identification information is insufficient, the recognition unit enlarges and re-localizes the license plate area based on the insufficient number of the characters, and recognizes the identification information of the license plate of the corresponding object again from the re-localized license plate area using the recognition model.

According to an exemplary embodiment, when a structure of the identification information in the localized license plate area is a preset structure, and a preset character is not recognized in the recognition of the identification information, the recognition unit adds the preset character to the recognized identification information and recognizes the added identification information as identification information of the corresponding object.

According to an exemplary embodiment, the recognition model includes at least two recognition models, and the recognition unit recognizes the identification information of the corresponding object based on confidence of identification information recognized by each of the two or more recognition models.

According to embodiments of the inventive concepts, license plate recognition rate, and recognition accuracy may be improved by recognizing number attached to an object using a model that localizes a license plate area from an object image, for example, an automobile image and a model that recognizes identification information from the localized license plate area.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
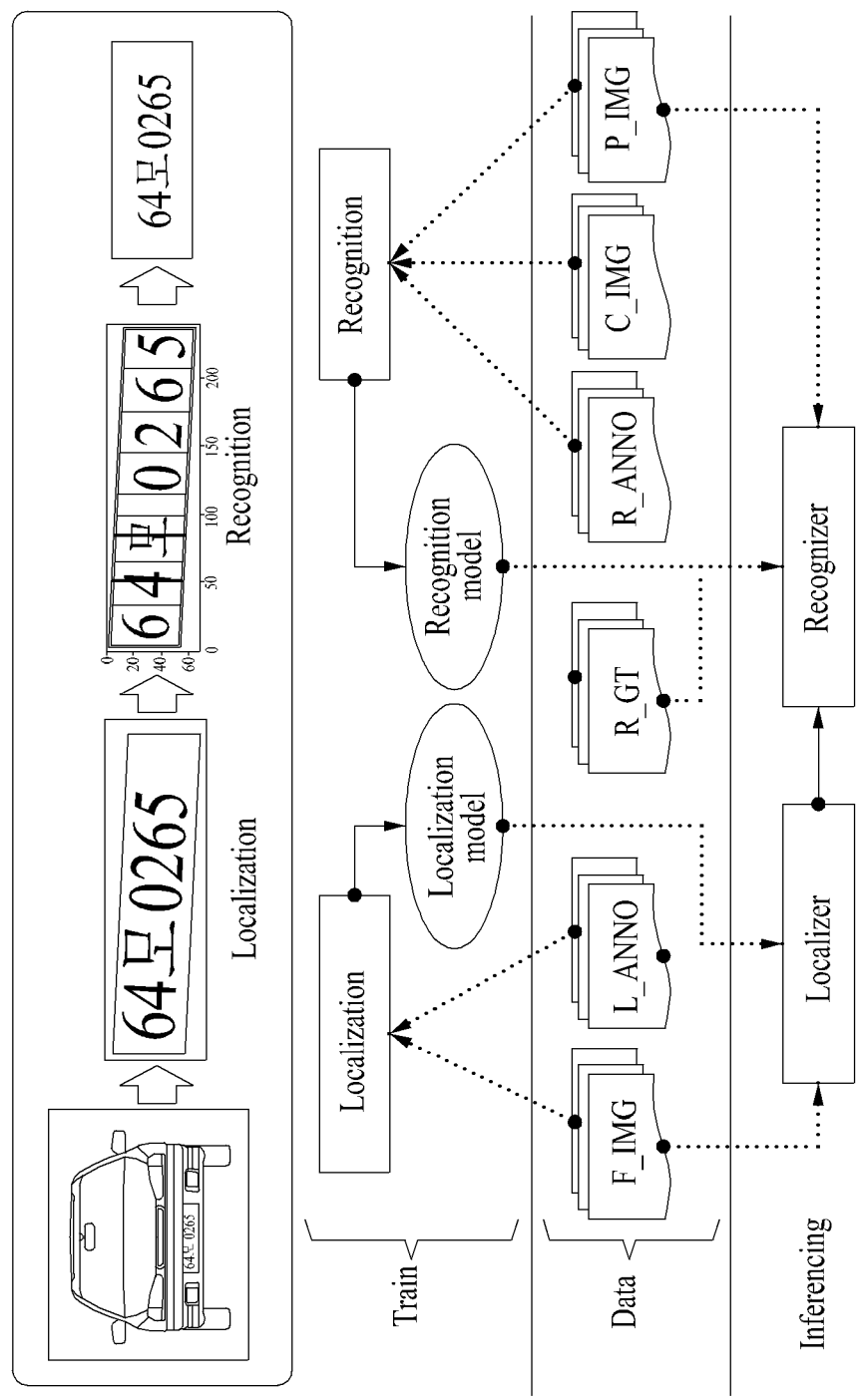
FIG. 1 shows a diagram for illustrating a system according to an embodiment of the inventive concept.

Hereinafter, embodiments according to the inventive concept will be described in detail with reference to the accompanying drawings. However, the inventive concept is not limited or restricted to embodiments. In addition, the same reference numerals shown in the drawings denote the same members.

Using a localization model for localizing a license plate attached to an object by learning of data including a noise pattern, and a recognition model for recognizing identification information of a license plate in a localized license plate area, the embodiments of the inventive concept are intended to improve recognition accuracy of the identification information of the object license plate in an input image.

Herein, the noise pattern may include various noise patterns that may be caused by environmental factors such as partial noise due to light, contrast degradation, and the like. The inventive concept is explained using only some noise patterns among these noise patterns.

An object in the inventive concept may include any kind of object, including automobile, motorcycle, and the like, to which a license plate with identification information may be affixed.

Hereinafter, the detailed description of the inventive concept is described by restricting the object to the automobile. However, it is apparent to those skilled in the art that the object in the inventive concept is not limited to the automobile, and may include any type of object that may be identified by attaching the license plate.

FIG. 1 shows a diagram for illustrating a system according to an embodiment of the inventive concept.

As shown in FIG. 1, the system of the inventive concept includes generating means for generating the localization model for localizing the license plate area of the automobile through training or learning using the training data, and the recognition model for recognizing the identification information of the automobile license plate or identification information of the automobile in the localized license plate area, localizer for localizing the license plate area of the automobile from the input image using the generated localization model, and a recognizer for recognizing the license plate identification information in the license plate area localized by the localizer using the recognition model.

In FIG. 1, F_IMG may mean full video or image including an automobile, L_ANNO may mean an annotation for license plate area localization training data, R_GT may mean a ground truth for recognition, C_IMG may mean an image of character (for example, letter or number), P_IMG may mean a license plate image, and R_ANNO may mean an annotation for number recognition training data.

Herein, training data for generating the localization model may include not only a clear image, but also an image including a predetermined noise pattern, for example, a noise pattern due to light or beam, a noise pattern due to shadow or darkness, and the like applied to the clear image. In addition, training data for generating the recognition model may also include a clear license plate image, but also a license plate image with a predetermined noise pattern, for example, a noise pattern due to light or beam, a noise pattern due to shadow or darkness, and the like applied to the clear license plate image.

Figure 2:
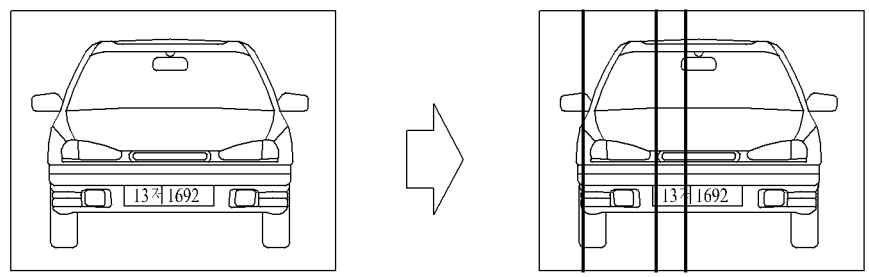
FIG. 2 is an exemplary view of noise patterns applied to generate a localization model and a recognition model.
Figure 2:

In one example, as shown in FIG. 2A, a vertical beam-based noise pattern may be applied to the full video, such that an image including the vertical beam-based noise pattern may be added to the training data. In addition, as shown in FIG. 2B, an image of the license plate area with a dot noise, a shadow noise, a noise due to beam, an image with a degraded contrast due to bright light, and the like may be added to the training data.

Thus, since the localization model and the recognition model are generated through the training, in which the training data including various noise patterns are added, the inventive concept may accurately localize the license plate area from the input image inputted to recognize the license plate. In addition, the inventive concept may further improve the accuracy of recognition of the identification information of the automobile, that is the vehicle number from the localized license plate area. That is, the inventive concept includes data on an error that may occur in localization of the license plate area, and an error that may occur in recognition of the identification information. The inventive concept generates the models through the training using these training data, therefore recognition rate may be improved.

Figure 3:
FIG. 3 is an exemplary view of a single label recognition in a license plate recognition.
Figure 3:

Furthermore, the inventive concept may modify the annotation included in the training data. In training data, for some of the identification information of the license plate, for example, as shown in FIG. 3, for a label of "Seoul", which means a region in the identification information, the number of the training data may be reduced by recognizing the identification information as a group or a label instead of recognizing one character at a time. That is, when only "Seo" is correctly recognized at a corresponding position of the license plate due to the noise pattern, it may be recognized as "Seoul". In addition, in a case of "Daejeon" and "Daegu", when only "jeon" or "gu" is recognized, each may be recognized directly as "Daejeon" and "Daegu", respectively. Thus, the inventive concept may reduce the number of classes of the training data by recognizing it as a single label, therefore the recognition accuracy may be improved even though a noise pattern is included in the single label.

The inventive concept may improve the accuracy of the recognition of the vehicle number of the automobile using the localization model and the recognition model thus generated. Recognition processes of the vehicle number will be described with reference to FIG. 4 to FIG. 8 as follows.

Figure 4:
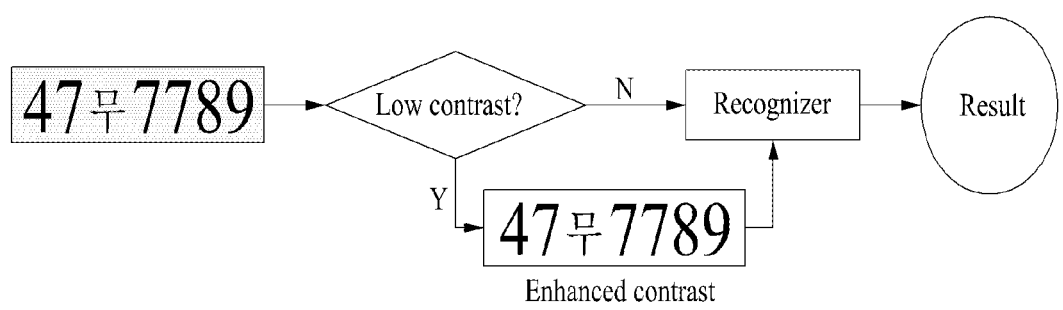
FIG. 4 shows a flow diagram of an operation according to an embodiment for a license plate recognition.

FIG. 4 shows a flow diagram of a license plate recognition operation according to an embodiment, when a contrast is low.

With reference to FIG. 4, in the recognizing of the vehicle number of the automobile, when the automobile license plate area of the input image is localized by the localization model, the contrast of the localized license plate area is compared with a predetermined or set reference contrast. When the contrast of the license plate area is lower than the reference contrast, the contrast of the license plate area is increased to a certain contrast, for example, to the reference contrast. Then, the identification information, that is the vehicle number of the automobile is recognized using the recognition model. Thus, the vehicle number of the corresponding automobile may be recognized. Herein, the inventive concept may recognize the vehicle number accurately using the recognition model of the recognition means after processing the license plate area image clearly via a pre-process using adaptive histogram equalization.

Figure 5:
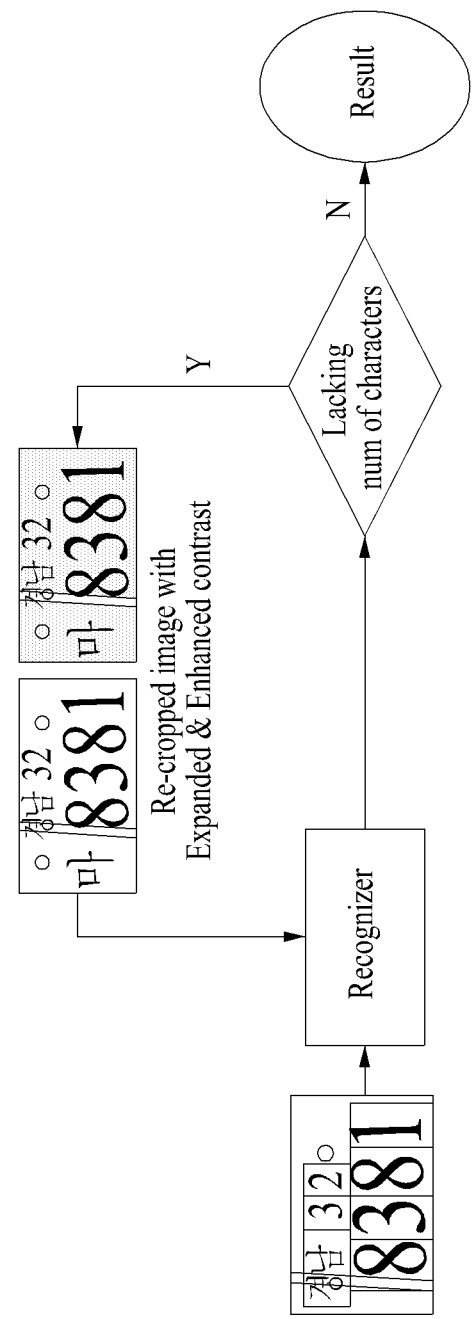
FIG. 5 shows a flow diagram of an operation according to another embodiment for a license plate recognition.

FIG. 5 shows a flow diagram of a license plate recognition operation in accordance with another embodiment, wherein the number of characters in the license plate area is insufficient.

As shown in FIG. 5, in the recognizing of the vehicle number of the automobile, when the automobile license plate area of the input image is localized by the localization model, the vehicle number is recognized from the localized license plate area using the recognition model. When it is determined that the number of characters, that is the number of characters including letters and numbers, is insufficient, it is judged that there is an error in localization of the license plate area or an error in character or number recognition. Then, the license plate area is recognized again after increasing the license plate area to be localized to a certain area, or after improving the contrast. Therefore, a correct vehicle number may be recognized through re-recognizing the missing character. Of course, by increasing the license plate area and adjusting the contrast at the same time, an error on the number of deficient characters may be solved, and the vehicle number may be accurately recognized. Herein, the improvement of the contrast, the increasement of the license plate area, and the like may be performed sequentially or in parallel, or at the same time depending on the situation.

Figure 6:
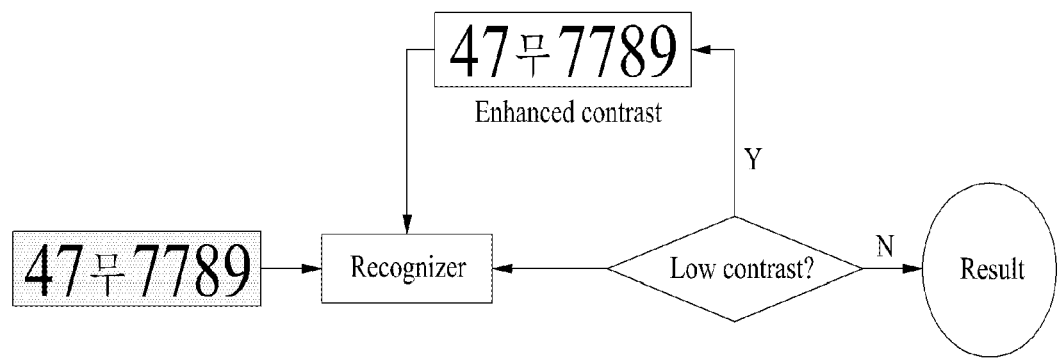
FIG. 6 shows a flow diagram of an operation according to still another embodiment for a license plate recognition.

FIG. 6 shows a flow diagram of a license plate recognition operation according to still another embodiment, wherein a string parsing error has occurred.

As shown in FIG. 6, in the recognizing of the vehicle number of the automobile, when the automobile license plate area of the input image is localized by the localization model, the vehicle number of the localized license plate area is recognized using the recognition model. When it is determined that a string parsing error on the recognized vehicle number has occurred, after improving the contrast by a certain amount, recognition process and string parsing error determination process are repeated. When the string parsing error does not occur via this repetition, corresponding recognition result may be recognized as the vehicle number of the automobile.

Figure 7:
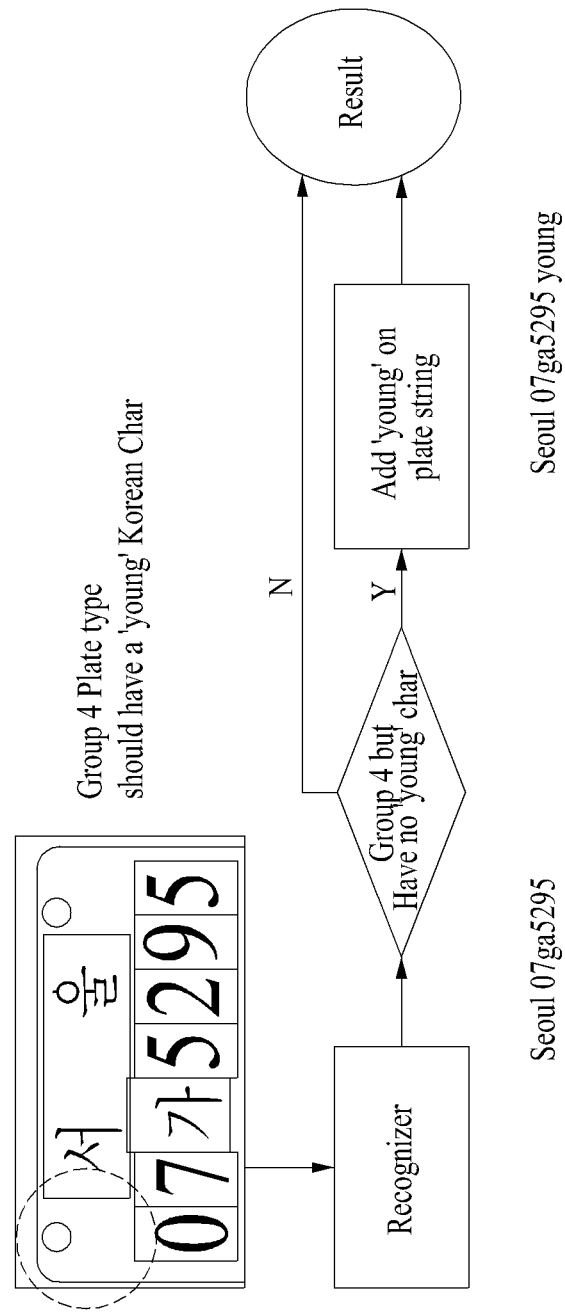
FIG. 7 shows a flow diagram of an operation according to yet another embodiment for a license plate recognition.

FIG. 7 shows a flow diagram of a license plate recognition operation according to yet another embodiment, wherein a preset character is added to the recognition result from a recognition model.

As shown in FIG. 7, in the recognizing of the vehicle number of the automobile, when the automobile license plate area of the input image is localized by the localization model, the vehicle number is recognized from the localized license plate area using the recognition model. When a structure of letters or numbers arranged in the license plate area is a preset structure, for example, when a structure of the automobile license plate is various, and the structure of letters or numbers is recognized to be same as one structure among the various structures, it may be determined whether a letter of a character, for example, "young" to be contained in the same structure exists. When the corresponding character exists, the recognition result is recognized as a final result. To the contrary, when the corresponding character does not exist, a result of adding the corresponding character to the recognition result may be recognized as a final recognition result. For example, when the recognition result is "Seoul Ga 5295", "Seoul Ga 5295 Young" with the "Young" added to the corresponding recognition result may be recognized as a final recognition result.

Figure 8:
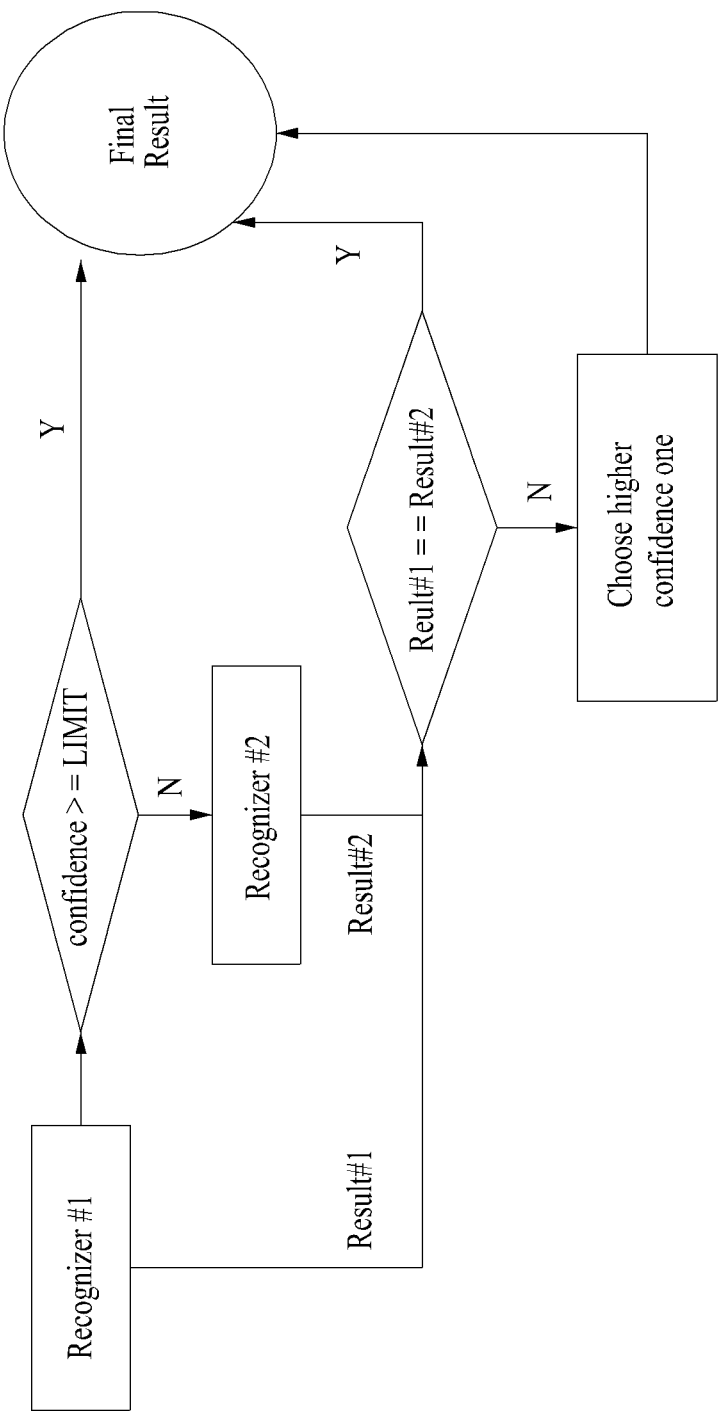
FIG. 8 shows a flow diagram of an operation according to further embodiment for a license plate recognition.

FIG. 8 shows a flow diagram of a license plate recognition operation according to further embodiment of the inventive concept, wherein two recognition models are used to recognize a vehicle number.

As shown in FIG. 8, in the recognizing of the vehicle number of the automobile, when the automobile license plate area of the input image is localized by the localization model, the vehicle number is recognized using a first recognition model (recognizer #1) of two recognition models. When it is determined that confidence for the recognized vehicle number is equal to or greater than preset confidence (LIMIT), a recognition result of the first recognition model is provided as a final result. When the confidence for the recognized vehicle number is lower than the preset confidence (LIMIT), the vehicle number is recognized using a second recognition model (recognizer #2). When the vehicle numbers recognized by both recognition models are the same, then the recognized vehicle number is provided as a final result. On the other hand, when it is determined that the vehicle numbers recognized by the two recognition models are different, the vehicle number with higher confidence between the two vehicle numbers recognized by two recognition models is provided as a final result. That is, in FIG. 8, it is intended to improve the recognition accuracy of the vehicle number based on the multiple recognition models and the confidence of the recognition result.

Although FIG. 8 illustrates sequential use of the two recognition models, the inventive concept is not limited thereto. The recognition results from two recognition models may be processed in parallel, and a final recognition result may be provided based on the recognition results, or a confidence of the recognition results processed in parallel.

Thus, even when the input image contains noise, the automobile license plate recognition method according to the inventive concept may improve localization accuracy of the automobile license plate area and recognition accuracy of the vehicle number based on the localization model that localizes the automobile license plate area through the training with the training data including the noise pattern and the recognition model that recognizes the vehicle number from the localized automobile license plate area.

Figure 9:
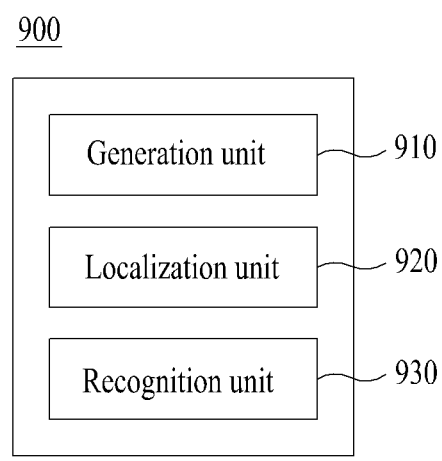
FIG. 9 shows a configuration of a system according to an embodiment of the inventive concept.

FIG. 9 shows a configuration of the system according to an embodiment of the inventive concept, wherein the configuration of the system is for performing the operations of the above-described FIG. 1 to FIG. 8.

With reference to FIG. 9, a system 900 according to the inventive concept includes a generation unit 910, a localization unit 920, and a recognition unit 930.

The generation unit 910 generates the localization model configured for localizing the license plate area of the automobile through the training or the learning using the training data, and the recognition model configured for recognizing the automobile license plate identification information or the automobile identification information from the localized license plate area.

Herein, the generation unit 910 may generate the localization model through the training using the training data including not only the clear image, but also the image including preset noise pattern, for example, the noise pattern due to the light or the beam, the noise pattern due to the shadow or the darkness, and the like. The generation unit 910 may generate the recognition model through the training using the training data including not only the clear license plate image, but also the license plate image including the preset noise pattern, for example, the noise pattern due to the light or the beam, the noise pattern due to the shadow or the darkness, and the like applied to the clear license plate image.

Furthermore, the generation unit 910 may modify the annotation used in the learning during the training process, or may generate a model through the training, in which a plurality of characters are recognized as a single label for specific data.

The localization unit 920 localizes the license plate area from the input image using the localization model generated by the generation unit 910.

Herein, in localization of the license plate area based on a situation, the localization unit 920 may pre-process for processing the contrast, and the like of the input image, then may localize the license plate area.

In recognition of the vehicle number in the license plate area localized by the localization unit 910, the recognition unit 930 recognizes the vehicle number of the corresponding automobile using the recognition model generated by the generation unit.

Herein, the recognition unit 930 compares the contrast of the localized license plate area with the predetermined or set reference contrast. When the contrast of the license plate area is lower than the reference contrast, after the contrast of the license plate area is improved to a certain contrast, for example, the reference contrast, identification information of the license plate area may be recognized using the recognition model.

Herein, when it is determined that the number of characters of the recognized vehicle number, that is, the number of characters including letters and numbers, is insufficient, the recognition unit 930 judges that the error on the localization of the license plate area or the error on the character or number recognition has occurred. Then, the recognition unit 930 recognizes again the license plate area after increasing the license plate area to a certain area, or after improving the contrast. Therefore, the correct vehicle number may be recognized by re-recognizing the missing character.

Further, the recognition unit 930 recognizes the vehicle number from the localized license plate area using the recognition model. When it is determined that the string parsing error on the recognized vehicle number has occurred, the recognition unit 930 improves the contrast by a certain amount, then performs the recognition process and the string parsing error determination process repetitively. When the string parsing error does not occur via this repetition, corresponding recognition result may be recognized as the vehicle number of the automobile.

Moreover, when the structure of letters or numbers arranged in the license plate area is the preset structure, for example, when the structure of the automobile license plate is various, and the structure of letters or numbers is recognized as having the same structure as any one of the various automobile license plates, the recognition unit 930 determines whether a letter of a character, for example, "young" to be included in the structure exists. When the corresponding character exists, the recognition result is recognized as a final result. On the other hand, when the corresponding character does not exist, a result of adding the corresponding character to the recognition result may be recognized as a final result.

Furthermore, when the automobile license plate area is localized, the recognition unit 930 may recognize the vehicle number of the corresponding automobile, that is the identification information may be recognized based on the recognition result using the plurality of the recognition models and the confidence of the recognition result.

It will be apparent to those skilled in the art that the system according to the inventive concept may include all of the features described with reference to the method of FIG. 1 to FIG. 8, even though the features are not shown in FIG. 9.

The system or device described above may be realized by hardware elements, software elements and/or combinations thereof. For example, the systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may process an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may generate a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for recognizing a license plate, the method comprising:
    generating a localization model configured for localizing a license plate area attached to an object by learning using image data including the preset object, and generating a recognition model configured for recognizing identification information of the license plate by learning using preset license plate image data;
    when input image is received, localizing a license plate area from the input image using the localization model; and
    recognizing identification information of a license plate attached to a corresponding object from the localized license plate area using the recognition model,
    wherein the generating of the localization model and the recognition model includes increasing the image data by combining at least one predetermined first noise pattern with the image data, and generating the localization model by learning using the increased image data including the first noise pattern, and increasing the license plate image data by combining at least one second noise pattern with the license plate image data, and generating the recognition model by learning using the increased license plate data including the second noise pattern;
    wherein the recognizing the identification information of a license plate comprises, when it is determined that a string parsing error on the recognized vehicle number has occurred, improving contrast of the localized license plate area by a certain amount, and repeating the recognition process and the string parsing error determination process, and when the string parsing error does not occur during the repetition, recognizing corresponding recognition result as the identification information of the license plate attached.

2. The method of claim 1, wherein recognizing the identification information includes:
    when a contrast of the localized license plate area is lower than a preset reference contrast,
    recognizing the identification information of the license plate of the corresponding object using the recognition model after adjusting the contrast of the localized license plate area to the reference contrast.

3. The method of claim 1, wherein recognizing the identification information includes:
    when the number of characters included in the recognized identification information is insufficient,
    enlarging and re-localizing the license plate area based on the insufficient number of the characters, and recognizing the identification information of the license plate of the corresponding object again from the re-localized license plate area using the recognition model.

4. The method of claim 1, wherein recognizing the identification information includes:
when a structure of the identification information in the localized license plate area is a preset structure, and a preset character is not recognized in the recognition of the identification information,
adding the preset character to the recognized identification information and recognizing the added identification information as identification information of the corresponding object.

5. The method of claim 1, wherein the recognition model includes at least two or more recognition models, and
wherein the recognizing of the identification information includes recognizing the identification information of the corresponding object based on a confidence of identification information recognized using each of the two or more recognition models.

\* \* \* \* \*